US012386367B1

(12) United States Patent
Wei et al.

(10) Patent No.: US 12,386,367 B1
(45) Date of Patent: Aug. 12, 2025

(54) MAP CONSTRUCTION METHOD, CONTROLLER, AND AUTONOMOUS MOBILE MACHINE

(71) Applicant: VisionNav Robotics USA Inc., Acworth, GA (US)

(72) Inventors: Lei Wei, Acworth, GA (US); Bingchuan Yang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/175,332

(22) Filed: Apr. 10, 2025

(30) Foreign Application Priority Data

Jan. 27, 2025 (CN) .......................... 202510126689.0

(51) Int. Cl.
| | | |
|---|---|---|
| G05D 1/00 | (2024.01) | |
| G05D 1/246 | (2024.01) | |
| G06T 7/579 | (2017.01) | |
| G06V 10/10 | (2022.01) | |
| G06V 20/56 | (2022.01) | |
| G05D 105/80 | (2024.01) | |
| G05D 107/50 | (2024.01) | |
| G05D 109/10 | (2024.01) | |
| G05D 111/10 | (2024.01) | |

(52) U.S. Cl.
CPC ............ G05D 1/246 (2024.01); G06T 7/579 (2017.01); G06V 10/16 (2022.01); G06V 20/56 (2022.01); *G05D 2105/87* (2024.01); *G05D 2107/50* (2024.01); *G05D 2109/10* (2024.01); *G05D 2111/10* (2024.01); *G06T 2207/10028* (2013.01); *G06T 2207/30252* (2013.01)

(58) Field of Classification Search
CPC .............. G05D 1/246; G05D 2107/50; G05D 2105/87; G05D 2109/10; G05D 2111/10; G06T 7/579; G06T 2207/10028; G06T 2207/30252; G06V 10/16; G06V 20/56
USPC ......................................................... 701/25
See application file for complete search history.

(56) References Cited

FOREIGN PATENT DOCUMENTS

| | | | |
|---|---|---|---|
| CN | 109160451 A | 1/2019 | |
| CN | 111056490 A | 4/2020 | |
| CN | 117023192 A * | 11/2023 | ............. B65G 67/02 |
| CN | 114445549 B * | 2/2025 | ............... G06T 5/80 |
| CN | 119559346 A * | 3/2025 | |

* cited by examiner

*Primary Examiner* — Tiffany P Young
(74) *Attorney, Agent, or Firm* — Westbridge IP LLC

(57) ABSTRACT

An autonomous mobile machine includes a controller. The controller is configured to execute program instructions to implement following steps: controlling, in response to a mapping task instruction, the autonomous mobile machine to move from a mapping start point to a mapping end point, the mapping end point being located in a loading space of a cargo container transportation vehicle; generating a point cloud map during a process of the movement by using point cloud data scanned by the sensor, the point cloud data including point cloud data obtained by scanning the cargo container transportation vehicle; and obtaining a planning map based on the point cloud map. The planning map is used to plan a path within the cargo container transportation vehicle.

20 Claims, 5 Drawing Sheets

MAP CONSTRUCTION METHOD, CONTROLLER, AND AUTONOMOUS MOBILE MACHINE

CROSS-REFERENCE TO RELATED APPLICATIONS

The present disclosure claims priority to Chinese Patent Application No. 202510126689.0, filed on Jan. 27, 2025, the content of which is incorporated herein by reference in its entirety.

TECHNICAL FIELD

The present disclosure relates to the field of intelligent control technologies, and in particular, to a map construction method, a controller, and an autonomous mobile machine.

BACKGROUND

A system that uses an autonomous mobile machine such as an automated guided vehicle (AGV) has advantages such as being highly unmanned, automated, and intelligent, which improves production efficiency and an operational level in industries such as warehousing, manufacturing, and logistics. In one of relatively typical scenarios, the autonomous mobile machine is usually responsible for handling tasks, mainly including loading/unloading, for a cargo container transportation vehicle such as a container truck or a container ship. For example, cargo is moved from a temporary storage area to a container truck compartment, or from a container truck compartment to a temporary storage area.

Due to a limited space of the cargo container transportation vehicle, in order to avoid collisions, high requirements are placed on positioning accuracy of the autonomous mobile machine. However, because a docking location and a docking pose of the cargo container transportation vehicle differ each time, in order to achieve path planning for the autonomous mobile machine, how to construct a planning map becomes a problem to be urgently solved.

SUMMARY

In view of this, the present disclosure provides a map construction method, a controller, and an autonomous mobile machine to facilitate construction of a planning map, thereby providing a basis for path planning for an autonomous mobile machine.

According to a first aspect, a map construction method is provided, and applied to an autonomous mobile machine equipped with a sensor. The method includes: controlling, in response to a mapping task instruction, the autonomous mobile machine to move from a mapping start point to a mapping end point, where the mapping end point is located in a loading space of a cargo container transportation vehicle; generating a point cloud map during a process of the movement by using point cloud data scanned by the sensor, where the point cloud data includes point cloud data obtained by scanning the cargo container transportation vehicle; and obtaining a planning map based on the point cloud map, where the planning map is used to plan a path within the cargo container transportation vehicle.

Optionally, the obtaining the planning map based on the point cloud map includes: extracting, from the point cloud map, point cloud data that is within an operating height range of the cargo container transportation vehicle; and projecting the extracted point cloud data onto a ground plane to obtain the planning map.

Optionally, the projecting the extracted point cloud data onto the ground plane to obtain the planning includes: projecting the extracted point cloud data onto the ground plane and performing binarization processing to obtain an initial map; and performing rasterization on the initial map to obtain the planning map, where the rasterization includes: dividing the initial map into a plurality of grids, and determining a state of each of the plurality of grids based on a projection relationship between point cloud data and the each of the plurality of grids, where the state includes a state of being occupied or idle.

Optionally, the mapping task instruction includes: a static mapping path and a dynamic mapping path; and the controlling, in response to a mapping task instruction, the autonomous mobile machine to move from a mapping start point to a mapping end point includes: controlling the autonomous mobile machine to move from the mapping start point to a target location based on the static mapping path, where the target location is within a preset range of a distance to the cargo container transportation vehicle; and controlling the autonomous mobile machine to move from the target location to the mapping end point based on the dynamic mapping path.

Optionally, the generating the point cloud map during the process of the movement by using the point cloud data scanned by the sensor includes: in a process of controlling the autonomous mobile machine to move from the mapping start point to the target location, obtaining the point cloud data scanned by the sensor, and generating a first point cloud map by using a simultaneous localization and mapping (SLAM) module; and in a process of controlling the autonomous mobile machine to move from the target position to the mapping end point, obtaining the point cloud data scanned by the sensor, and generating a second point cloud map by using the SLAM module.

Optionally, the obtaining the point cloud data scanned by the sensor, and generating the first point cloud map by using the SLAM module includes: stitching, by using the SLAM module, a key frame in the point cloud data scanned by the sensor with a static point cloud map loaded during initialization of the autonomous mobile machine, to obtain the first point cloud map.

Optional, the method further includes: stitching the first point cloud map and the second point cloud map to obtain a third point cloud map, where the third point cloud map is used to determine a pose of the autonomous mobile machine during a process in which the autonomous mobile machine performs a handling task.

Optional, the method further includes: determining, based on the point cloud map and cargo size information, pose information of a storage location in the loading space of the cargo container transportation vehicle.

Optional, the method further includes: sending the planning map and the pose information of the storage location to a control system, so that the control system plans the path within the cargo container transportation vehicle based on the planning map and the pose information of the storage location.

Optional, the step of controlling, in response to the mapping task instruction, the autonomous mobile machine to move from the mapping start point to the mapping end point is performed by a system module; the step of generating the point cloud map during the process of the movement by using the point cloud data scanned by the sensor is performed by a map service module; and the step of obtaining the planning map based on the point cloud map is performed by the map service module; where the system module and the map service module are run on a controller.

Optionally, a perception service module is run on the controller; after receiving the mapping task instruction, the system module sends a mapping start instruction to the map service module via the perception service module, to perform the step of controlling the autonomous mobile machine to move from the mapping start point to the mapping end point; and in response to the mapping start instruction, the map service module performs the step of generating the point cloud map during the process of the movement by using the point cloud data scanned by the sensor.

Optional, the method further includes: in response to the movement of the autonomous mobile machine to the mapping end point, sending, by the system module, a mapping end instruction to the map service module via the perception service module; and in response to the mapping end instruction, stopping, by the map service module, generating the point cloud map, and performing the step of obtaining the planning map based on the point cloud map.

Optional, the method further includes: in response to the mapping end instruction, providing, by the map service module, the point cloud map to the perception service module; and determining, by the perception service module, pose information of a storage location in the loading space based on the point cloud map, and in response to a request from the system module, returning the pose information of the storage location in the loading space to the system module.

Optional, the method further includes: in response to reception of the pose information of the storage location, sending, by the system module, a task idle instruction to the perception service module; and in response to reception of the task idle instruction, clearing, by the perception service module, intermediate data generated by determining the pose information of the storage location, and notifying the map service module to stop providing the point cloud map.

Optionally, the providing, by the map service module, the point cloud map to the perception service module includes: publishing, by the map service module, the generated point cloud map through enhanced communication abstraction layer (ECAL) publishing, and providing published topic information to the perception service module for subscription; where the perception service module obtains the point cloud map based on the topic information.

Optional, the method further includes: after stopping generating the point cloud map, sending, by the map service module, a mapping stop success state to the system module via the perception service module.

Optional, the method further includes: in response to reception of the mapping stop success state, requesting, by the system module, the planning map from the map service module; and returning, by the map service module, the planning map to the system module in response to the request.

Optional, the returning, by the map service module, the planning map to the system module in response to the request includes: in response to the request, when the map service module completes generation of the planning map, returning the planning map to the system module; or when the map service module does not complete generation of the planning map, returning an incomplete state to the system module, where after receiving the incomplete state, the system module waits for a preset period of time and then requests the planning map from the map service module again.

According to a second aspect, a controller is provided. The controller is configured to execute program instructions to implement the steps of the method in any implementation of the first aspect.

According to a third aspect, an autonomous mobile machine is provided. The autonomous mobile machine includes a controller. The controller is configured to execute program instructions to implement the steps of the method in any implementation of the first aspect.

BRIEF DESCRIPTION OF THE DRAWINGS

To describe technical solutions in embodiments of the present disclosure or in the prior art more clearly, the following briefly introduces the accompanying drawings required for the embodiments. It is clear that the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

Figure 1:
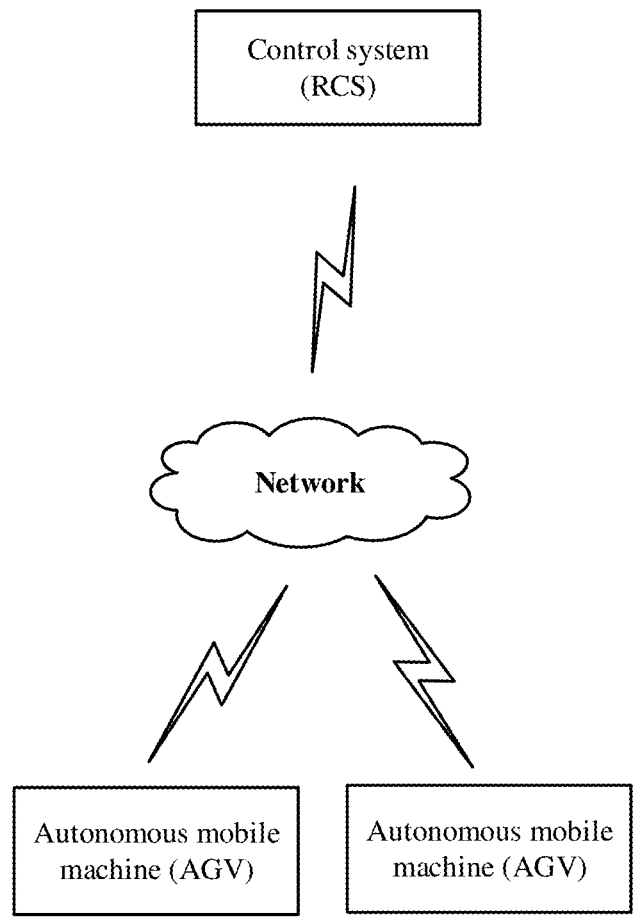
FIG. 1 is a diagram of a system architecture applicable to an embodiment of the present disclosure.

The following clearly describes the technical solutions in embodiments of the present disclosure with reference to the accompanying drawings in embodiments of the present disclosure. Apparently, the described embodiments are some but not all of embodiments of the present disclosure. All other embodiments obtained by persons of ordinary skill in the art based on embodiments of the present disclosure shall fall within the protection scope of the present disclosure.

Terms used in the embodiments of the present disclosure are merely intended to describe specific embodiments, but are not intended to limit the present disclosure. The singular forms of "a/an", "said", and "the" used in embodiments of the present disclosure and the appended claims are also intended to include plural forms, unless the context clearly implies otherwise.

It should be understood that, the term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

Depending on the context, for example, the word "if" used herein may be explained as "while" or "when" or "in response to determining" or "in response to detecting". Similarly, depending on the context, phrases "if determining" or "if detecting (a stated condition or event)" may be explained as "when determining" or "in response to determining" or "when detecting (the stated condition or event)" or "in response to detecting (the stated condition or event)".

For ease of understanding, the relevant terms are explained below.

Processor: it is responsible for executing core functions such as calculation, control and decision-making. It may receive data from a sensor, run control algorithms, and command an actuator to complete a task. Common processor types may include: a central processing unit (CPU), a digital signal processor (DSP), a microcontroller unit (MCU), and so on. The processor in the specification may refer to a collection of processors for performing the same or different tasks.

Memory: it is configured to store data or a program. A memory in the specification may be referred to as a collection of memories for performing the same or different tasks.

Controller: at the hardware level, the controller generally includes a processor and a memory. Optionally, the controller may also include input and output interfaces, a mainboard, peripheral circuits and elements. At the software level, the controller generally includes a control algorithm, an operating system, a communication protocol, and so on. A controller in the specification may be referred to as a collection of controllers for performing the same or different tasks.

Automated guided forklift (AGF): it is an intelligent industrial vehicle that integrates a forklift technology and an automated guided vehicle (AGV) technology. It can automatically complete tasks such as material handling and stacking.

Due to a limited space of a cargo container transportation vehicle, in order to avoid collisions, high requirements are placed on positioning accuracy of an autonomous mobile machine. However, because a docking location and a docking pose of the cargo container transportation vehicle differ each time, it is impossible to pre-construct a map for the cargo container transportation vehicle. In current existing implementations, some implementations require installation of an external sensor near the cargo container transportation vehicle to scan the cargo container transportation vehicle every time the cargo container transportation vehicle arrives, to construct a map. However, such a manner has at least the following disadvantages.

Firstly, to ensure accuracy of mapping, the external sensor needs to fully scan the cargo container transportation vehicle, especially an internal environment of the cargo container transportation vehicle, such as the interior of a compartment. Therefore, the external sensor usually needs to be placed at a bridging position between an edge of an outer platform and the cargo container transportation vehicle. However, the bridging position is a position through which the autonomous mobile machine enters and exits the cargo container transportation vehicle, and a passage space needs to be reserved. This makes it difficult to install the external sensor at a position and a construction requirement is extremely high.

Secondly, because a map scanned by the external sensor needs to be stitched with a static map of the autonomous mobile machine, a coordinate conversion relationship between two maps needs to be calibrated, and calibration accuracy needs to be very high. Otherwise, the autonomous mobile machine may collide inside the cargo container transportation vehicle, for example, collide with a compartment wall of the container truck.

Lastly, the external sensor requires additional power cables and network cables for connection, and are exposed to a semi-open outdoor environment. In order to avoid impact of wind, rain, and sun, the external sensor needs to be protected and maintained over a long period of time, which brings additional maintenance costs.

In view of this, the present disclosure provides a new idea. In order to facilitate understanding of the present disclosure, the following first describes a system architecture on which the present disclosure is based. FIG. 1 is an example system architecture applicable to an embodiment of the present disclosure. As shown in FIG. 1, the system architecture may include: an autonomous mobile machine and an autonomous mobile machine control system (RCS).

The autonomous mobile machine refers to a computer-controlled tool that is equipped with an electromagnetic or optical automated guided apparatus or the like, has its own power or power conversion apparatus, and is capable of automatically moving along a specified path. In embodiments of the present disclosure, the autonomous mobile machine may be mobile and may undertake specific tasks, such as transportation, and handling (including picking up and unloading). For example, the autonomous mobile machine can be an automated guided vehicle (AGV), a logistics robot, an automated guided forklift, or the like.

In an embodiment of the present disclosure, an on-board software system is installed on the autonomous mobile machine, and has a simultaneous localization and mapping (SLAM) function, a map generation function of generating a planning map based on a mapping result, a motion control function of controlling movement and operation of the autonomous mobile machine, and the like.

The autonomous mobile machine control system (RCS) may be set up on a server and is responsible for scheduling each autonomous mobile machine, including task allocation, path planning, and instruction delivery.

The autonomous mobile machine control system may be set up on an independent server, a server group, or a cloud server. The cloud server, also referred to as a cloud computing server or a cloud host, is a host product in a cloud computing service system, to solve defects of difficult management and weak service scalability in conventional physical hosts and virtual private server (VPS) services. In addition, the autonomous mobile machine control system may also be set up on a computer terminal with strong computing power.

It should be understood that a quantity of autonomous mobile machines and autonomous mobile machine control systems (RCSs) in FIG. 1 is merely an example. Depending on implementation requirements, there may be any quantity of autonomous mobile machines and control systems.

Figure 2:
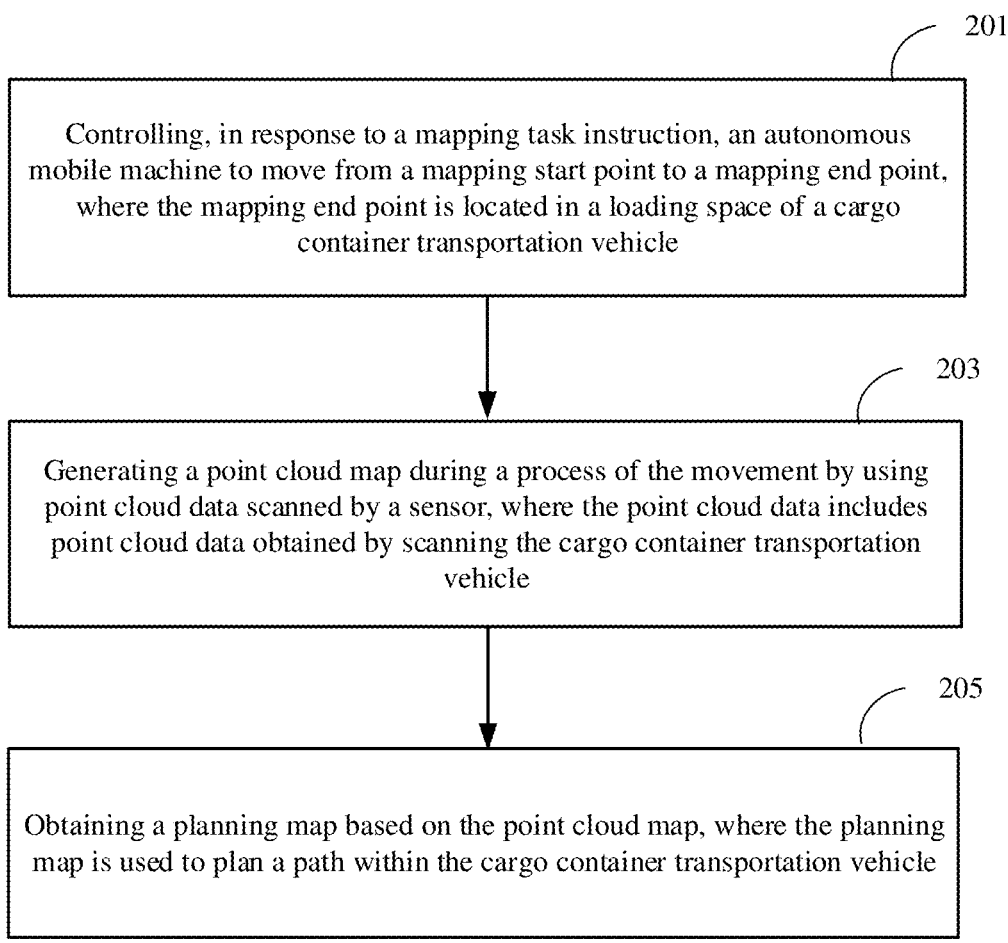
FIG. 2 is a flowchart of a map construction method according to an embodiment of the present disclosure.

FIG. 2 is a flowchart of a map construction method according to an embodiment of the present disclosure. The method may be performed by an autonomous mobile machine in the system shown in FIG. 1, and the autonomous mobile machine is equipped with a sensor. As shown in FIG. 2, the method may be performed by a controller mounted on the autonomous mobile machine, and the method may include the following steps.

Step 201: controlling, in response to a mapping task instruction, the autonomous mobile machine to move from a mapping start point to a mapping end point, where the mapping end point is located in a loading space of a cargo container transportation vehicle.

Step 203: generating a point cloud map during a process of the movement by using point cloud data scanned by the sensor, where the point cloud data includes point cloud data obtained by scanning the cargo container transportation vehicle.

Step 205: obtaining a planning map based on the point cloud map, where the planning map is used to plan a path within the cargo container transportation vehicle.

It can be learned from the foregoing procedure that, in a process of controlling the autonomous mobile machine to move from the mapping start point to the mapping end point, the point cloud data scanned by the sensor mounted on the autonomous mobile machine (including the point cloud data obtained by scanning the cargo container transportation vehicle) is used to generate the point cloud map, and then the planning map is obtained, where the planning map is used to plan the path within the cargo container transportation vehicle. In this manner, the autonomous mobile machine can intelligently, efficiently, and accurately obtain external and internal environmental information of the cargo container transportation vehicle, thereby creating the planning map and providing a basis for path planning for the autonomous mobile machine.

Because the sensor mounted on the autonomous mobile machine is used for scanning and mapping, in comparison with a conventional manner of disposing an external sensor at a bridging position, construction difficulty and maintenance costs are reduced, and calibration of a relationship between two coordinate systems of the external sensor and the autonomous mobile machine is avoided. Therefore, implementation is more convenient and the costs are lower.

The following describes, in detail with reference to embodiments, each step in the foregoing procedure and the effects that can be further produced. It should be noted that limitations related to "first", "second", and the like in the present disclosure do not have limitations in terms of size, order, quantity, and the like, and are merely used for distinguishing in name. For example, "first point cloud map", "second point cloud map" and "third point cloud map" are merely used for distinguishing the point cloud maps in terms of names.

First, the foregoing Step 201 of "controlling, in response to a mapping task instruction, the autonomous mobile machine to move from a mapping start point to a mapping end point" is described in detail with reference to embodiments.

When the cargo container transportation vehicle stops at a designated location (usually at a platform), staff can trigger a terminal device to send a task start instruction to the RCS. For example, when the staff determines that the cargo container transportation vehicle has stopped at the platform, the staff can trigger the terminal device to send a task start instruction to the RCS by pressing a physical or virtual button on the terminal device or inputting a command or the like. In addition to the triggering by the staff, another manner may also be used.

After receiving the task start instruction, the RCS generates a mapping task. A process of generating the mapping task is mainly a process of path planning, that is, planning a path from the mapping start point to the mapping end point based on location information and a work map of the cargo container transportation vehicle.

In the foregoing path from the mapping start point to the mapping end point, the mapping start point is usually a starting location of the autonomous mobile machine. When the autonomous mobile machine is not performing a task, it is usually located in its own parking place, which may be a location such as a warehouse or a carport. Therefore, the foregoing starting location may be a parking place.

In an implementation, the mapping end point may be a specific location in the loading space of the cargo container transportation vehicle, which is referred to as a first location in embodiments of the present disclosure. Such a case is usually used in loading scenarios. In loading scenarios, the loading space of the cargo container transportation vehicle is usually relatively empty, and the autonomous mobile machine can move into the loading space to scan an internal environment.

In another implementation, the mapping end point may be a second location within a first distance to the cargo container transportation vehicle. Such a case is usually used in unloading scenarios. In unloading scenarios, the loading space of the cargo container transportation vehicle is usually full of cargo, and the autonomous mobile machine cannot enter the loading space. Usually, scanning is performed at a bridging position for boarding or a specific position between the bridging position for boarding and the cargo container transportation vehicle.

In an embodiment of the present disclosure, the mapping task instruction may include a static mapping path and a dynamic mapping path. The static mapping path is a path from the starting location to a target location. The dynamic mapping path is a path from the target location to the mapping end point, where the target location is within a second distance to the cargo container transportation vehicle, and the first distance is less than or equal to the second distance. For example, the target location may be set to a location for boarding the cargo container transport vehicle. For example, if the cargo container transportation vehicle is a container truck, the target location may be a bridging position for boarding the truck. For another example, if the cargo container transportation vehicle is a container ship, the target location may be a bridging position for boarding the ship. For another example, if the cargo container transportation vehicle is a flying wing vehicle, the target location may be any location near the flying wing vehicle.

Figure 3:
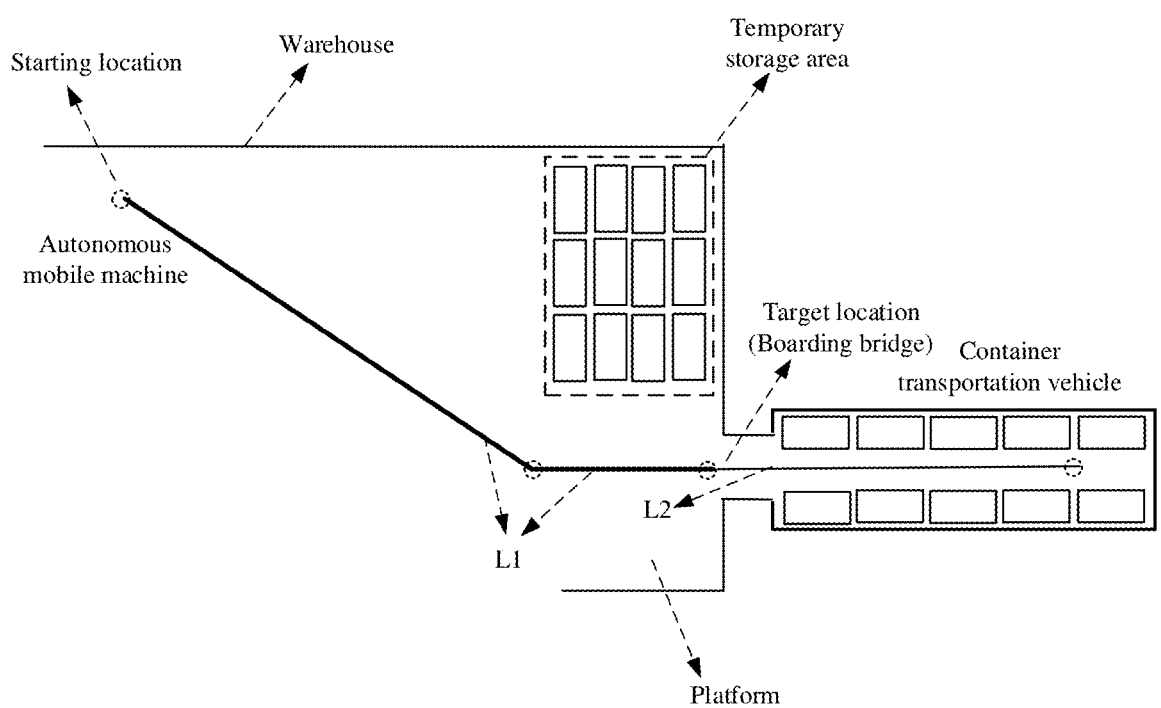
FIG. 3 is a schematic diagram of a path for controlling movement of an autonomous mobile machine according to an embodiment of the present disclosure.

The static mapping path is usually planned based on static map, and is used to instruct the autonomous mobile machine to move from the starting location to a position such as a bridging position for boarding, as shown by the path L1 (thick line) in FIG. 3. The dotted circles represent some trajectory positions of the autonomous mobile machine on the path. The dynamic mapping path is usually preset to instruct the autonomous mobile machine to enter the loading space of the cargo container transportation vehicle from a position such as a bridging position for boarding, as shown by the path L2 (thin line) in FIG. 3. Because there is initially no accurate map of the cargo container transportation vehicle, the dynamic mapping path may be preset with a low accuracy requirement, and may be preset based on an approximate docking location and size of the cargo container transportation vehicle, provided that no collision with the cargo container transportation vehicle occurs.

In this embodiment of the present disclosure, the autonomous mobile machine can be controlled to move from the mapping start point to the target location based on the static mapping path; and the autonomous mobile machine can be controlled to move from the target location to the mapping end point based on the dynamic mapping path.

The foregoing Step 203 of "generating a point cloud map during a process of the movement by using point cloud data scanned by the sensor" is described in detail below with reference to embodiments.

In this embodiment of the present disclosure, the sensor mounted on the autonomous mobile machine includes radars such as a laser radar, a millimeter wave radar, or a time of flight (ToF) radar, and may further include a visual sensor such as a camera.

In a process of controlling the autonomous mobile machine to move from the mapping start point to the target location, the point cloud data scanned by the sensor may be obtained, and a first point cloud map may be generated by using a SLAM module. In a process of controlling the autonomous mobile machine to move from the target location to the mapping end point, the point cloud data scanned by the sensor is obtained, and a second point cloud map is generated by using the SLAM module.

Specifically, when the autonomous mobile machine is controlled to move based on the static mapping path included in the mapping task instruction, a local SLAM algorithm may be used for positioning. The local SLAM algorithm may include: stitching point cloud data of latest N key frames collected in real time with a static point cloud map to obtain the first point cloud map, which may be considered as a map obtained by aligning the collected latest N key frames on the static point cloud map. Then, an algorithm such as generalized iterative closest point (GICP) is used to calculate a relative pose of a point cloud of a current frame relative to the first point cloud map, so as to determine a current pose. The local SLAM algorithm is an existing algorithm, and therefore is not described herein in detail.

The autonomous mobile machine is controlled to move from the target location to the loading space of the cargo container transportation vehicle along the dynamic mapping path included in the mapping task instruction. During the process of the movement, the autonomous mobile machine uses the mounted sensor for scanning. During the entire process, the exterior and interior of the cargo container transportation vehicle can be scanned, thereby creating a dynamic point cloud map of an area of the cargo container transportation vehicle, which is referred to as the second point cloud map in embodiments of the present disclosure.

Then, the first point cloud map and the second point cloud map are stitched to obtain a third point cloud map. The third point cloud map, as a full point cloud map, may be used to determine a pose of the autonomous mobile machine when the autonomous mobile machine performs a handling task.

The foregoing Step 205 of "obtaining a planning map based on the point cloud map, where the planning map is used to plan a path within the cargo container transportation vehicle" is described in detail below with reference to embodiments.

In this embodiment of the present disclosure, point cloud data that is within an operating height range of the cargo container transportation vehicle can be extracted from the point cloud map, and the extracted point cloud data may be projected onto a ground plane to obtain the planning map.

The operating height range of the cargo container transportation vehicle may be an empirical value, for example, a range of 0.2 to 2.5 meters selected based on a usual height of the cargo container transportation vehicle. The operating height range may alternatively be set based on an actual scenario.

The planning map is a two-dimensional map. After the extracted point cloud data is projected onto the ground plane, binarization processing is performed to obtain an initial map, and then rasterization is performed on the initial map to obtain a raster map as the planning map. The rasterization may include: dividing the initial map into a plurality of grids, and determining a state of each of the plurality of grids based on a projection relationship between point cloud data and the each of the plurality of grids, where the state includes a state of being occupied or idle.

If a grid is occupied, it is determined that there is an obstacle in the grid and the grid is impassable; if a grid is not occupied, it is determined that there is no obstacle in the grid and the grid is passable. A state of the grid may be determined based on a quantity of points, in the point cloud, projected onto the grid. For example, the quantity of points, in the point cloud, projected onto the grid exceeds a preset quantity threshold, and in this case, it is determined that the grid is in an occupied state; otherwise, it is determined that the grid is in an idle state. The preset quantity threshold may be determined based on an empirical value and/or a safety requirement.

In addition to the raster map, the planning map may also be another form of map, such as a dot density map.

The planning map can use an image format, such as portable network graphics (PNG), Bitmap (BMP) and other lossless compression image formats.

Furthermore, pose information of a storage location in the loading space of the cargo container transportation vehicle can be determined based on the point cloud map. The pose information of the storage location is used to identify the storage location in the loading space during a handling process of the autonomous mobile machine. For example, an internal environment status of the loading space of the cargo container transportation vehicle can be perceived from the point cloud map, and a pose of the storage location in the loading space can be determined by using the perceived internal environment status of the loading space, a cargo size, and other information.

In this embodiment of the present disclosure, the planning map and the pose information of the storage location can be sent to the RCS, so that the RCS can plan the path within the cargo container transportation vehicle based on the planning map and the pose information of the storage location.

In an implementation, the foregoing method procedure may be performed by a module running on the controller. In this embodiment of the present disclosure, the controller may be a processor or a control chip in the autonomous mobile machine. The processor may be a general-purpose CPU, a microprocessor, one or more integrated circuits, or the like.

The following describes implementation of the foregoing method by using a system module, a perception service module, and a map service module running on the controller as an example. In addition to the module division manner describe above, module division manners with other granularities may alternatively be used, which fall within the protection scope of the present disclosure, provided that similar functions are achieved.

Figure 4:
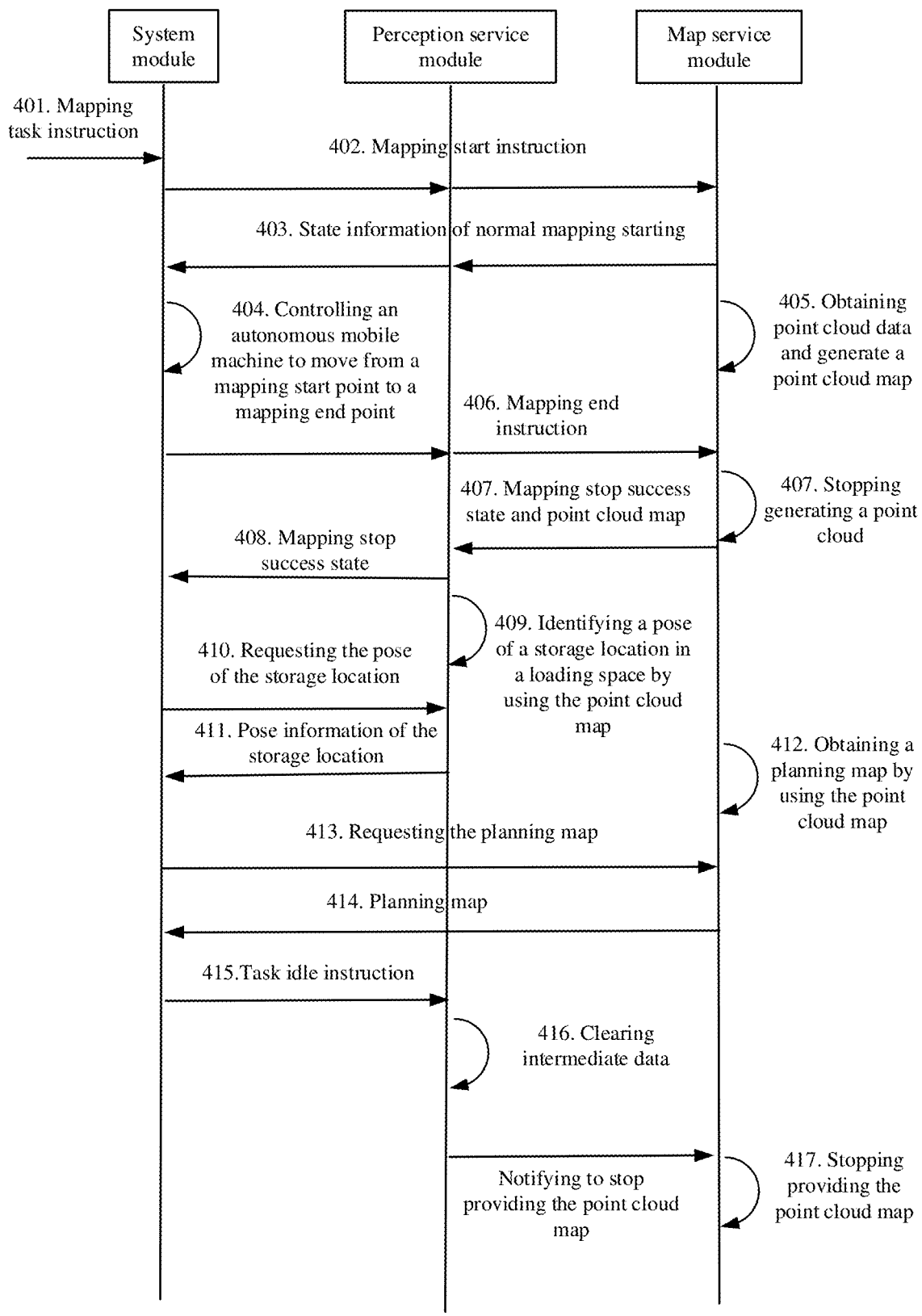
FIG. 4 is a detailed flowchart of interaction between modules according to an embodiment of the present disclosure.

FIG. 4 is a detailed flowchart of interaction between modules according to an embodiment of the present disclosure. As shown in FIG. 4, the interaction procedure specifically includes the following steps.

Step 401: receiving, by a system module, a mapping task instruction from an RCS.

Step 402: sending, by the system module, a mapping start instruction to a map service module via a perception service module.

It should be noted that when the system module, perception service module, and map service module related in embodiments of the present disclosure are running on an autonomous mobile machine, they may be presented in a form of processes, that is, a system process, a perception service process, and a map service process that are running. In this case, the system module, the perception service module, and the map service module essentially use inter-process communication to exchange instructions or data.

In an implementation, after receiving the mapping start instruction, the perception service module may send the mapping start instruction to the map service module by using enhanced communication abstraction layer (ECAL) remote procedure call (RPC), to notify the map service module to start a mapping task. Specifically, the perception service module may serve as an ECAL server to send the mapping start instruction to the map service module serving as an ECAL client.

In addition to the ECAL RPC, other inter-process communication mechanisms or middleware interaction protocols, such as message queuing telemetry transport (MQTT), may alternatively be used.

Step 403: returning, by the map service module, state information of normal mapping starting to the system module via the perception service module.

After receiving the mapping start instruction, the map service module starts a mapping task, for example, starts a corresponding service process and performs related verification. After the verification succeeds, the map service module enters a state of normal mapping starting, and returns the state information of normal mapping starting.

Step 404: after receiving the state information of normal mapping starting, controlling, by the system module, the autonomous mobile machine to move from a mapping start point to a mapping end point.

At the same time, in Step 405, obtaining, by the map service module, point cloud data scanned by a sensor mounted on the autonomous mobile machine, and generating a point cloud map by using the point cloud data.

As described in the previous embodiment, the mapping task instruction may include two pieces of path information: a static mapping path from a starting location to a target location (for example, a bridging position for boarding) and a dynamic mapping path from the target location to the mapping end point. Accordingly, the system module controls the autonomous mobile machine to move from the starting location to the target location, and then from the target location to the mapping end point.

In a process of controlling the movement of the autonomous mobile machine based on the static mapping path, the map service module obtains the point cloud data scanned by the sensor, and generates a first point cloud map by using a SLAM module. In a process of controlling the movement of the autonomous mobile machine based on the dynamic mapping path, the map service module obtains the point cloud data (essentially point cloud image frames) scanned by the sensor, and generates a second point cloud map by using the SLAM module.

Specifically, the system module uses a local SLAM algorithm for positioning when controlling the movement of the autonomous mobile machine based on the static mapping path included in the mapping task instruction. The local SLAM algorithm may include: stitching a point cloud of latest N key frames collected in real time with a static point cloud map to obtain the first point cloud map, which may be considered as a map obtained by aligning the collected latest N key frames on the static point cloud map. Then, an algorithm such as generalized iterative closest point (GICP) is used to calculate a relative pose of a point cloud of a current frame relative to the first point cloud map, so as to determine a current pose. The local SLAM algorithm is an existing algorithm, and therefore is not described herein in detail.

The system module controls the autonomous mobile machine to move from the target location to a loading space of a cargo container transportation vehicle along the dynamic mapping path included in the mapping task instruction. During the process of the movement, the autonomous mobile machine uses the mounted sensor for scanning. During the entire process, the exterior and interior of the cargo container transportation vehicle can be scanned, and the map service module creates a dynamic point cloud map of an area of the cargo container transportation vehicle, which is referred to as the second point cloud map in embodiments of the present disclosure.

Step 406: in response to the movement of the autonomous mobile machine to the mapping end point, sending, by the system module, a mapping end instruction to the map service module via the perception service module.

In an implementation, after receiving the mapping end instruction, the perception service module may send the mapping end instruction to the map service module by using ECAL RPC, to notify the map service module to stop the mapping task. Specifically, the perception service module may serve as an ECAL server to send the mapping end instruction to the map service module serving as an ECAL client.

In addition to the ECAL RPC, other inter-process communication mechanisms may alternatively be used.

Step 407: in response to the mapping end instruction, stopping, by the map service module, generating the point cloud map, sending a mapping stop success state to the perception service module, and providing the point cloud map to the perception service module.

In an implementation, the map service module may provide the second point cloud map to the perception service module to generate a planning map.

Furthermore, the first point cloud map and the second point cloud map may be stitched to obtain a third point cloud map. The third point cloud map, as a full point cloud map, may be used to determine a pose of the autonomous mobile machine when the autonomous mobile machine performs a handling task.

The static point cloud map is a point cloud map loaded by the autonomous mobile machine during startup, and covers a working area of the autonomous mobile machine. In this embodiment of the present disclosure, the working area mainly refers to an area such as a warehouse, a platform, or a temporary storage area, and may include a location for boarding the cargo container transportation vehicle, but usually does not include an area (for example, an area after boarding the container transportation vehicle, or an area of the loading space of the container transportation vehicle) outside the location for boarding the cargo container transportation vehicle.

In an implementation, when providing the point cloud map (such as the second point cloud map) to the perception service module, the map service module may publish the generated point cloud map by using ECAL PUB (publishing), and provide a published topic (topic information) to the perception service module for subscription. The perception service module obtains the point cloud map based on the topic.

The ECAL PUB is a core component of an ECAL communication architecture, providing an efficient communication mechanism, supporting shared memory for local communication, and allowing different processes to directly access a same physical memory area. In an embodiment of the present disclosure, the perception service module serves as a subscriber, and the map service module serves as a publisher. The publisher specifies a topic, and the subscriber receives, based on this topic, data through shared memory. Such a manner can significantly reduce a delay and bandwidth usage of data exchange, and is particularly suitable for inter-process transmission of a large file such as the point cloud map in the embodiments of the present disclosure, thereby improving performance of the autonomous mobile machine.

Step 408: sending, by the perception service module, the mapping stop success state to the system module.

Step 409: determining, by the perception service module, pose information of a storage location in the loading space of the cargo container transportation vehicle by using the point cloud map.

In this embodiment of the present disclosure, the perception service module can perceive an internal environment status of the loading space of the cargo container transportation vehicle from the point cloud map, and determine a pose of the storage location in the loading space by using the perceived internal environment status of the loading space, a cargo size, and other information.

Step 410: in response to reception of the mapping stop success state, requesting, by the system module, a pose of the storage location from the perception service module.

Step 411: returning, by the perception service module, the pose information of the storage location in the loading space of the cargo container transportation vehicle to the system module.

If the perception service module has not yet determined the pose information of the storage location after receiving a request, the perception service module returns a non-completed state to the system module. After receiving the non-completed state, the system module may wait for a specific period of time and then request the pose of the storage location from the perception service module again, until the perception service module determines the pose information of the storage location and successfully returns the pose information of the storage location to the system module.

In this embodiment of the present disclosure, the pose information of the storage location in the loading space of the cargo container transportation vehicle is stored locally in the autonomous mobile machine, so that the autonomous mobile machine can identify the storage location in the loading space of the cargo container transportation vehicle during execution of a subsequent handling task.

Step 412: after stopping generating a point cloud, obtaining, by the map service module, the planning map by using the point cloud map.

In this embodiment of the present disclosure, the map service module can extract point cloud data that is within an operating height range of the cargo container transportation vehicle from the point cloud map, and project the extracted point cloud data onto a ground plane to obtain the planning map.

Step 413: in response to reception of the mapping stop success state, requesting, by the system module, the planning map from the map service module.

Step 414: in response to the request, returning, by the map service module, the planning map to the system module.

If the map service module has not yet generated the planning map after receiving the request, the map service module returns a non-completed state to the system module. After receiving the non-completed state, the system module may wait for a specific period of time and then request the planning map from the map service module again, until the map service module completes generation of the planning map and successfully returns the planning map to the system module.

It should be noted that Steps 409 to 411 on a sub-procedure of obtaining the pose information of the storage location and Steps 412 to 414 on a sub-procedure of obtaining the planning map described above are performed in parallel, and thereby can be executed simultaneously or in any order. The order shown in the figure is merely one of the orders.

Step 415: in response to reception of the pose information of the storage location, sending, by the system module, a task idle instruction to the perception service module.

Step 416: in response to reception of the task idle instruction, clearing, by the perception service module, intermediate data generated by identifying the pose information of the storage location, and notifying the map service module to stop providing the point cloud map.

Step 417: stopping, by the map service module, providing the point cloud map.

After receiving the notification, the map service module determines that the planning map has been generated and stops providing the point cloud map, for example, stops publishing the generated point cloud map by using ECAL PUB.

In this embodiment of the present disclosure, after receiving the planning map and the pose information of the storage location, the system module can send the planning map and the pose information of the storage location to the RCS, so that the RCS can plan a path within the cargo container transportation vehicle by using the planning map and the pose information of the storage location to generate a handling task, and send a handling task instruction to the autonomous mobile machine that will complete the handling task. The handling task instruction includes path information, obtained based on the planning map and the location pose information, for executing the handling task. It can be learned that the method for generating a planning map provided in this embodiment of the present disclosure provides a basis for the autonomous mobile machine to perform a handling task.

Particular embodiments of this specification are described above. Other embodiments fall within the scope of the claims. In some cases, the actions or steps described in the claims may be performed in an order different from that in embodiments while still achieving expected results. In addition, the processes depicted in the accompanying drawings do not necessarily require the particular order shown or a sequential order to achieve expected results. In some implementations, multitasking and parallel processing are also possible or may be advantageous.

Figure 5:
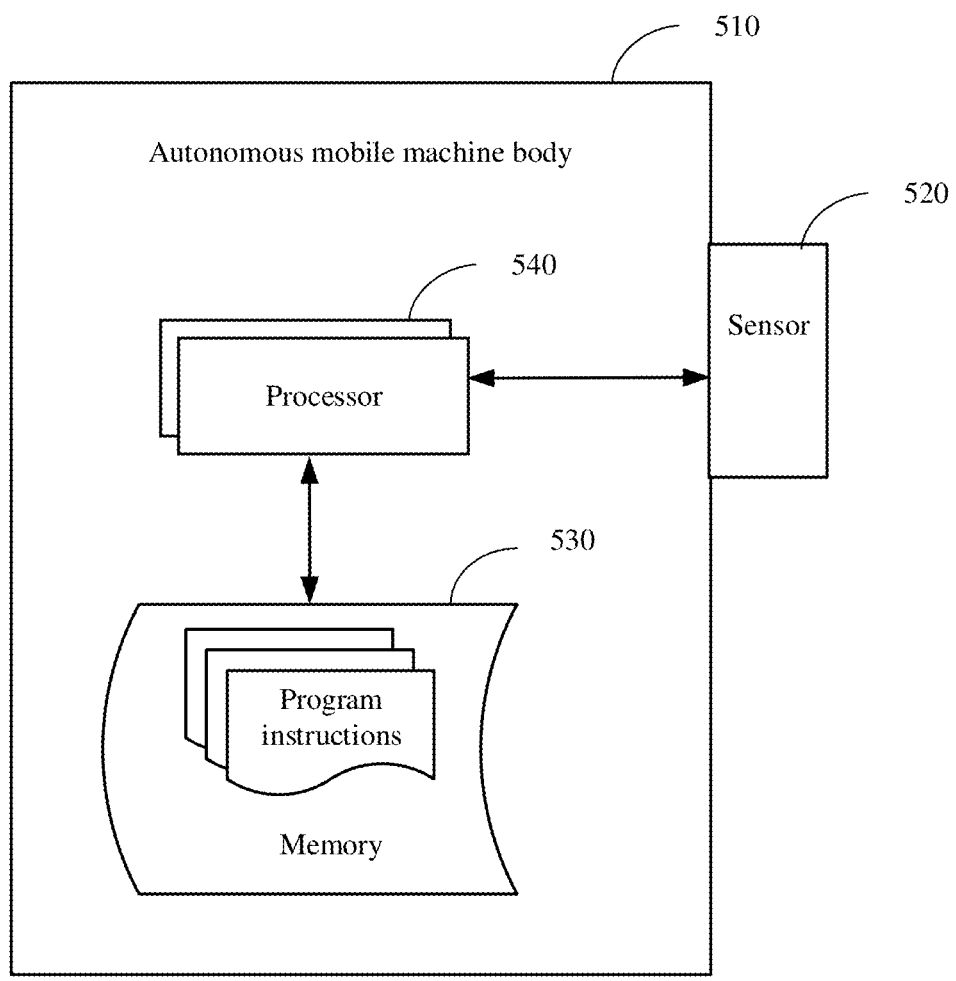
FIG. 5 is a schematic block diagram of an autonomous mobile machine according to an embodiment of the present disclosure.

According to another aspect of an embodiment, an autonomous mobile machine is provided. FIG. 5 is a schematic diagram of composition of an autonomous mobile machine according to an embodiment of the present disclosure. As shown in FIG. 5, the autonomous mobile machine includes: an autonomous mobile machine body 510, a sensor 520 mounted on the autonomous mobile machine body, and a controller. The controller may include a memory 530 and a processor 540.

The sensor 520 is configured to scan a cargo container transportation vehicle.

The memory 530 is configured to store program instructions.

The controller is configured to read the program instructions stored in the memory 530 to perform the following processing: controlling, in response to a mapping task instruction, the autonomous mobile machine to move from a mapping start point to a mapping end point, where the mapping end point is located in a loading space of a cargo container transportation vehicle; generating a point cloud map during a process of the movement by using point cloud data scanned by the sensor, where the point cloud data includes point cloud data obtained by scanning the cargo container transportation vehicle; and obtaining a planning map based on the point cloud map, where the planning map is used to plan a path within the cargo container transportation vehicle.

In some embodiments, when obtaining the planning map based on the point cloud map, the controller may specifically perform the following: extracting, from the point cloud map, point cloud data that is within an operating height range of the cargo container transportation vehicle; and projecting the extracted point cloud data onto a ground plane to obtain the planning map.

In some embodiments, when projecting the extracted point cloud data onto the ground plane to obtain the planning map, the controller may specifically perform the following: projecting the extracted point cloud data onto the ground plane and performing binarization processing to obtain an initial map; and performing rasterization on the initial map to obtain the planning map, where the rasterization includes: dividing the initial map into a plurality of grids, and determining a state of each of the plurality of grids based on a projection relationship between point cloud data and the each of the plurality of grids, where the state includes a state of being occupied or idle.

In some embodiments, the mapping task instruction may include a static mapping path and a dynamic mapping path; and accordingly, when controlling, in response to the mapping task instruction, the autonomous mobile machine to move from the mapping start point to the mapping end point, the controller may specifically perform the following: controlling the autonomous mobile machine to move from the mapping start point to a target location based on the static mapping path, where the target location is within a preset range of a distance to the cargo container transportation vehicle; and controlling the autonomous mobile machine to move from the target location to the mapping end point based on the dynamic mapping path.

In some embodiments, when generating the point cloud map during the process of the movement by using the point cloud data scanned by the sensor, the controller may specifically perform the following: in a process of controlling the autonomous mobile machine to move from the mapping start point to the target location, obtaining the point cloud data scanned by the sensor, and generating a first point cloud map by using a SLAM module; and in a process of controlling the autonomous mobile machine to move from the target position to the mapping end point, obtaining the point cloud data scanned by the sensor, and generating a second point cloud map by using the SLAM module.

In some embodiments, when obtaining the point cloud data scanned by the sensor, and generating the first point cloud map by using the SLAM module, the controller may specifically perform the following: stitching, by using the SLAM module, a key frame in the point cloud data scanned by the sensor with a static point cloud map loaded during initialization of the autonomous mobile machine, to obtain the first point cloud map.

In some embodiments, the controller may further perform the following: stitching the first point cloud map and the second point cloud map to obtain a third point cloud map, where the third point cloud map is used to determine a pose of the autonomous mobile machine during a process in which the autonomous mobile machine performs a handling task.

In some embodiments, the controller may further perform the following: determining, based on the point cloud map and cargo size information, pose information of a storage location in the loading space of the cargo container transportation vehicle.

In some embodiments, the controller may further perform the following: sending the planning map and the pose information of the storage location to a control system, so that the control system plans the path within the cargo container transportation vehicle based on the planning map and the pose information of the storage location.

In some embodiments, the sensor 520 may include radars such as a laser radar, a millimeter wave radar, or a time of flight (ToF) radar, and may further include a visual sensor such as a camera.

In some embodiments, there may be one or more processors 540. The processor 540 may use a general-purpose CPU, a microcontroller, an application-specific integrated circuit (ASIC), or one or more integrated circuits for implementation.

The memory 530 may be implemented in the form of read only memory (ROM), random access memory (RAM), static storage device, dynamic storage device, or the like.

It should be noted that, although the foregoing autonomous mobile machine shows only the autonomous mobile machine body 510, the sensor 520, the controller, and the like, during a specific implementation process, the autonomous mobile machine may further include other components necessary for achieving normal operation. In addition, a person skilled in the art may understand that the foregoing autonomous mobile machine may include only components necessary for implementing the solutions of the present disclosure, and does not necessarily include all components shown in the figure.

According to still another aspect of an embodiment, a controller is provided. The controller is configured to perform the steps described in the foregoing method embodiment. For example, in response to a mapping task instruction, the autonomous mobile machine is controlled to move from a mapping start point to a mapping end point, where the mapping end point is located in a loading space of a cargo container transportation vehicle; a point cloud map is generated during a process of the movement by using point cloud data scanned by the sensor; and a planning map is obtained based on the point cloud map, where the planning map is used to plan a path within the cargo container transportation vehicle.

Embodiments in this specification are all described in a progressive manner, for same or similar parts in embodiments, mutual reference may be made. Each embodiment focuses on what is different from other embodiments. Especially, an apparatus embodiment is basically similar to a method embodiment, and therefore is described briefly; and for related parts, reference may be made to partial descriptions in the method embodiment. The apparatus embodiments described above are merely an example. The units described as separate parts may be or may not be physically separate, and parts displayed as units may be or may not be physical units, that is, may be located at one position, or may be distributed on a plurality of network units. Some or all the modules may be selected according to an actual need to achieve the objectives of the solutions of the embodiments.

A person of ordinary skill in the art may understand and implement embodiments of the present disclosure without creative efforts.

In addition, an embodiment of the present disclosure further provides a computer-readable storage medium, where the computer-readable storage medium stores a computer program. When the program is executed by a processor, the steps of the method in any one of the foregoing method embodiments is implemented.

Based on the foregoing descriptions of the implementations, a person skilled in the art may clearly understand that the present disclosure may be implemented by software in addition to a necessary universal hardware platform. Based on such an understanding, the technical solution of the present disclosure essentially or the part contributing to the prior art may be embodied in the form of a computer program product. The computer program product may be stored in a storage medium, such as a ROM/RAM, a magnetic disk, or an optical disc.

According to specific embodiments provided in the present disclosure, the present disclosure discloses the following technical effects.

Firstly, in the present disclosure, in a process of controlling an autonomous mobile machine to move from a mapping start point to a mapping end point, point cloud data (including point cloud data obtained by scanning a cargo container transportation vehicle) scanned by a sensor mounted on the autonomous mobile machine is used to generate a point cloud map, and then a planning map is obtained, where the planning map is used to plan a path within the cargo container transportation vehicle. In this manner, the planning map is created on the autonomous mobile machine, thereby providing a basis for path planning for the autonomous mobile machine.

In this manner, the autonomous mobile machine can intelligently, efficiently, and accurately obtain external and internal environmental information of the cargo container transportation vehicle, and accurately and clearly express internal storage location information of the cargo container transportation vehicle in the planning map. Even if a docking location and a docking pose of the cargo container transportation vehicle differ each time, the cargo container transportation vehicle can be accurately mapped, thereby providing a basis for efficient and accurate execution of a subsequent handling task.

Secondly, because the sensor mounted on the autonomous mobile machine is used for scanning and mapping, in comparison with a conventional manner of disposing an external sensor at a bridging position, construction difficulty and maintenance costs are reduced, and calibration of a relationship between two coordinate systems of the external sensor and the autonomous mobile machine is avoided. Therefore, implementation is more convenient and the costs are lower.

Thirdly, in the present disclosure, after a preset spatial range of the point cloud data is extracted and projected onto a ground plane, binarization processing is performed to obtain an initial map, and further, rasterization is performed on the initial map to obtain a two-dimensional planning map. The planning map can be used to clearly determine a location of an obstacle and environmental information, thereby making path planning for a subsequent handling task more convenient and accurate.

Fourthly, in the present disclosure, a system module, a perception module, and a map service module running on the autonomous mobile machine perform specific interaction and processing so that the sensor mounted on the autonomous mobile machine is used for scanning and mapping, and the generated point cloud map is used to generate the two-dimensional planning map, thereby creating the planning map and providing a basis for path planning for the autonomous mobile machine.

Fifthly, in the present disclosure, a first point cloud map formed in a process of moving from a starting location to a target location and a second point cloud map formed in a process of moving from the target location to a mapping end point are stitched, to obtain a complete third point cloud map. The complete third point cloud map can be used to determine a pose of the autonomous mobile machine during execution of a handling task, thereby ensuring that the autonomous mobile machine accurately and efficiently performs the handling task.

Sixthly, in the present disclosure, the point cloud data can be used to identify pose information of a storage location in a loading space of the cargo container transportation vehicle and the pose information can be provided to the system module, so that the autonomous mobile machine can accurately identify the storage location in the loading space during subsequent execution of a handling task, and assist a control system in path planning for the handling task.

Seventhly, in the present disclosure, an ECAL mechanism is used as a manner of inter-process communication between the perception service module and the map service module, and particularly, ECAL publishing is used to publish the generated point cloud map and published topic information is provided to the perception service module for subscription. This manner can significantly reduce a delay and bandwidth usage of data exchange, and is particularly suitable for inter-process transmission of a large file such as the point cloud map in embodiments of the present disclosure, thereby improving performance of the autonomous mobile machine.

Eighthly, in the present disclosure, after stopping generating the point cloud map, the map service module sends a mapping stop success state to the system module via the perception service module, and the system module then requests the planning map from the map service module, thereby effectively ensuring the integrity of the planning map.

Lastly, in the present disclosure, after receiving the pose information of the storage location, the system module notifies the perception service module in time, so that the perception service module can clear intermediate data and notify the map service module to stop providing the point cloud data, thereby effectively avoiding a waste of resources and improving performance of the autonomous mobile machine.

Certainly, any invention of the present disclosure does not necessarily need to achieve all of the advantages described above.

The technical solutions provided in the present disclosure are described in detail above. The principle and implementation of the present disclosure are described herein by using specific examples. The descriptions about embodiments of the present disclosure are merely provided, to help understand the method and core ideas of the present disclosure. In addition, a person of ordinary skill in the art can make variations and modifications to the present disclosure in terms of the specific implementations and application scopes according to the ideas of the present disclosure. Therefore, the content of this specification shall not be construed as a limitation on the present disclosure.

What is claimed is:

1. An autonomous mobile machine, comprising a controller, wherein the controller is configured to execute program instructions to implement following steps:
   controlling, in response to a mapping task instruction, the autonomous mobile machine to move from a mapping start point to a mapping end point, the mapping end point being located in a loading space of a cargo container transportation vehicle;
   generating a point cloud map during a process of the movement by using point cloud data scanned by the sensor, the point cloud data comprising point cloud data obtained by scanning the cargo container transportation vehicle; and
   obtaining a planning map based on the point cloud map, wherein the planning map is used to plan a path within the cargo container transportation vehicle.

2. The autonomous mobile machine according to claim 1, wherein the obtaining the planning map based on the point cloud map comprises:
   extracting, from the point cloud map, point cloud data that is within an operating height range of the cargo container transportation vehicle; and
   projecting the extracted point cloud data onto a ground plane to obtain the planning map.

3. The autonomous mobile machine according to claim 2, wherein the projecting the extracted point cloud data onto the ground plane to obtain the planning map comprises:
   projecting the extracted point cloud data onto the ground plane and performing binarization processing to obtain an initial map; and
   performing rasterization on the initial map to obtain the planning map, wherein the rasterization comprises: dividing the initial map into a plurality of grids, and determining a state of each of the plurality of grids based on a projection relationship between point cloud data and the each of the plurality of grids, wherein the state comprises a state of being occupied or idle.

4. The autonomous mobile machine according to claim 1, wherein the mapping task instruction comprises: a static mapping path and a dynamic mapping path; and
   the controlling, in response to the mapping task instruction, the autonomous mobile machine to move from the mapping start point to the mapping end point comprises:
   controlling the autonomous mobile machine to move from the mapping start point to a target location based on the static mapping path, wherein the target location is within a preset range of a distance to the cargo container transportation vehicle; and
   controlling the autonomous mobile machine to move from the target location to the mapping end point based on the dynamic mapping path.

5. The autonomous mobile machine according to claim 4, wherein the generating the point cloud map during the process of the movement by using the point cloud data scanned by the sensor comprises:
   in a process of controlling the autonomous mobile machine to move from the mapping start point to the target location, obtaining the point cloud data scanned by the sensor, and generating a first point cloud map by using a simultaneous localization and mapping (SLAM) module; and
   in a process of controlling the autonomous mobile machine to move from the target position to the mapping end point, obtaining the point cloud data scanned by the sensor, and generating a second point cloud map by using the SLAM module.

6. The autonomous mobile machine according to claim 5, wherein the obtaining the point cloud data scanned by the sensor, and generating the first point cloud map by using the SLAM module comprises:
   stitching, by using the SLAM module, a key frame in the point cloud data scanned by the sensor with a static point cloud map loaded during initialization of the autonomous mobile machine, to obtain the first point cloud map.

7. The autonomous mobile machine according to claim 5, wherein the controller is further configured to execute following steps:
   stitching the first point cloud map and the second point cloud map to obtain a third point cloud map, wherein the third point cloud map is used to determine a pose of the autonomous mobile machine during a process in which the autonomous mobile machine performs a handling task.

8. The autonomous mobile machine according to claim 1, wherein the controller is further configured to execute following steps:
   determining, based on the point cloud map and cargo size information, pose information of a storage location in the loading space of the cargo container transportation vehicle.

9. The autonomous mobile machine according to claim 8, wherein the controller is further configured to execute following steps:
   sending the planning map and the pose information of the storage location to a control system, so that the control system plans the path within the cargo container transportation vehicle based on the planning map and the pose information of the storage location.

10. The autonomous mobile machine according to claim 1, wherein the step of controlling, in response to the mapping task instruction, the autonomous mobile machine to move from the mapping start point to the mapping end point is performed by a system module;
   the step of generating the point cloud map during the process of the movement by using the point cloud data scanned by the sensor is performed by a map service module; and
   the step of obtaining the planning map based on the point cloud map is performed by the map service module;
   wherein the system module and the map service module are run on the controller.

11. The autonomous mobile machine according to claim 10, wherein a perception service module is run on the controller;
   after receiving the mapping task instruction, the system module sends a mapping start instruction to the map service module via the perception service module, to perform the step of controlling the autonomous mobile machine to move from the mapping start point to the mapping end point; and
   in response to the mapping start instruction, the map service module performs the step of generating the point cloud map during the process of the movement by using the point cloud data scanned by the sensor.

12. The autonomous mobile machine according to claim 11, wherein the controller is further configured to execute following steps:
   in response to the movement of the autonomous mobile machine to the mapping end point, sending, by the system module, a mapping end instruction to the map service module via the perception service module; and in response to the mapping end instruction, stopping, by the map service module, generating the point cloud map, and performing the step of obtaining the planning map based on the point cloud map.

13. The autonomous mobile machine according to claim 12, wherein the controller is further configured to execute following steps:

in response to the mapping end instruction, providing, by the map service module, the point cloud map to the perception service module; and determining, by the perception service module, pose information of a storage location in the loading space based on the point cloud map, and in response to a request from the system module, returning the pose information of the storage location in the loading space to the system module.

14. The autonomous mobile machine according to claim 13, wherein the controller is further configured to execute following steps:

in response to reception of the pose information of the storage location, sending, by the system module, a task idle instruction to the perception service module; and in response to reception of the task idle instruction, clearing, by the perception service module, intermediate data generated by determining the pose information of the storage location, and notifying the map service module to stop providing the point cloud map.

15. The autonomous mobile machine according to claim 13, wherein the providing, by the map service module, the point cloud map to the perception service module comprises:

publishing, by the map service module, the generated point cloud map through enhanced communication abstraction layer (ECAL) publishing, and providing published topic information to the perception service module for subscription;

wherein the perception service module obtains the point cloud map based on the topic information.

16. The autonomous mobile machine according to claim 12, wherein the controller is further configured to execute following steps:

after stopping generating the point cloud map, sending, by the map service module, a mapping stop success state to the system module via the perception service module.

17. The autonomous mobile machine according to claim 16, wherein the controller is further configured to execute following steps:

in response to reception of the mapping stop success state, requesting, by the system module, the planning map from the map service module; and returning, by the map service module, the planning map to the system module in response to the request.

18. The autonomous mobile machine according to claim 17, wherein the returning, by the map service module, the planning map to the system module in response to the request comprises:

in response to the request, when the map service module completes generation of the planning map, returning the planning map to the system module; or when the map service module does not complete generation of the planning map, returning an incomplete state to the system module, wherein after receiving the incomplete state, the system module waits for a preset period of time and then requests the planning map from the map service module again.

19. A controller, wherein the controller is configured to execute program instructions to implement following steps:

controlling, in response to a mapping task instruction, the autonomous mobile machine to move from a mapping start point to a mapping end point, the mapping end point being located in a loading space of a cargo container transportation vehicle;

generating a point cloud map during a process of the movement by using point cloud data scanned by the sensor, the point cloud data comprising point cloud data obtained by scanning the cargo container transportation vehicle; and obtaining a planning map based on the point cloud map, wherein the planning map is used to plan a path within the cargo container transportation vehicle.

20. A map construction method, comprising:

controlling, in response to a mapping task instruction, the autonomous mobile machine to move from a mapping start point to a mapping end point, the mapping end point being located in a loading space of a cargo container transportation vehicle;

generating a point cloud map during a process of the movement by using point cloud data scanned by the sensor, the point cloud data comprising point cloud data obtained by scanning the cargo container transportation vehicle; and obtaining a planning map based on the point cloud map, wherein the planning map is used to plan a path within the cargo container transportation vehicle.

* * * * *